(12) United States Patent
Rigney et al.

(10) Patent No.: US 6,985,172 B1
(45) Date of Patent: Jan. 10, 2006

(54) MODEL-BASED INCIDENT DETECTION SYSTEM WITH MOTION CLASSIFICATION

(75) Inventors: Michael P. Rigney, San Antonio, TX (US); Michael J. Magee, Rio Medina, TX (US); Ernest A. Franke, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 553 days.

(21) Appl. No.: 10/056,665

(22) Filed: Jan. 25, 2002

Related U.S. Application Data

(63) Continuation-in-part of application No. 08/968,916, filed on Nov. 6, 1997, now Pat. No. 6,411,328, which is a continuation of application No. 08/565,144, filed on Dec. 1, 1995, now abandoned.

(51) Int. Cl.
*H04N 7/18* (2006.01)
*H04N 5/225* (2006.01)

(52) U.S. Cl. ..................................... 348/149; 348/169
(58) Field of Classification Search ................ 348/143, 348/152, 169, 149; 382/103, 262, 291, 118; 375/240.08
See application file for complete search history.

(56) References Cited

U.S. PATENT DOCUMENTS

| | | | |
|---|---|---|---|
| 4,317,117 A | 2/1982 | Chasek | 343/6 |
| 4,692,806 A * | 9/1987 | Anderson et al. | 358/209 |
| 4,847,772 A | 7/1989 | Michalopoulos et al. | 364/436 |
| 5,001,558 A | 3/1991 | Burley et al. | 358/113 |
| 5,034,986 A * | 7/1991 | Karmann et al. | 382/103 |
| 5,063,603 A * | 11/1991 | Burt | 382/115 |
| 5,109,435 A * | 4/1992 | Lo et al. | 382/48 |
| 5,161,107 A | 11/1992 | Mayeaux et al. | 364/436 |
| 5,265,172 A | 11/1993 | Markandey et al. | 382/17 |
| 5,280,530 A | 1/1994 | Trew et al. | 382/1 |
| 5,283,573 A | 2/1994 | Takatou et al. | 340/937 |
| 5,285,273 A | 2/1994 | James et al. | 348/169 |
| 5,296,852 A | 3/1994 | Rathi | 340/933 |
| 5,301,239 A | 4/1994 | Toyama et al. | 382/1 |
| 5,317,311 A | 5/1994 | Martell et al. | 340/905 |
| 5,375,058 A | 12/1994 | Bass | 364/439 |
| 5,396,429 A | 3/1995 | Hanchett | 364/436 |
| 5,402,118 A | 3/1995 | Aoki | 340/937 |
| 5,416,711 A | 5/1995 | Gran et al. | 364/436 |
| 5,448,484 A | 9/1995 | Bullock et al. | 364/436 |
| 5,463,698 A | 10/1995 | Meyer | 382/276 |
| 5,512,942 A * | 4/1996 | Otsuki | 348/143 |
| 5,557,543 A | 9/1996 | Parsons | 364/516 |
| 5,559,496 A | 9/1996 | Dubats | 340/539 |

* cited by examiner

*Primary Examiner*—Mehrdad Dastouri
*Assistant Examiner*—Erick Rekstad
(74) *Attorney, Agent, or Firm*—Baker Botts L.L.P.

(57) ABSTRACT

Surveillance apparatus and methods effective for detecting incidents are based upon improved image processing techniques applied to infrared and visible light spectrum images in a time sequence. A reference image is generated by removing motion objects from an image of a region of interest. The reference image is compared to an image to be analyzed to detect motion. Detected motion is analyzed and classified as motion objects. The motion objects are then compared to a motion model, which classifies the objects as being anticipated or unanticipated.

16 Claims, 6 Drawing Sheets

MODEL-BASED INCIDENT DETECTION SYSTEM WITH MOTION CLASSIFICATION

RELATED APPLICATION

This application is a continuation-in-part application of application Ser. No. 08/968,916 filed Nov. 6, 1997, entitled, "METHODS AND APPARATUS FOR TRAFFIC INCIDENT DETECTION", now U.S. Pat. No. 6,411,328, which is a continuation of application Ser. No. 08/565,144 filed on Dec. 1, 1995, entitled "METHODS AND APPARATUS FOR TRAFFIC INCIDENT DETECTION", now abandoned.

TECHNICAL FIELD

This invention relates to image processing, and more particularly to motion detection in video images, such as for surveillance purposes.

BACKGROUND OF THE INVENTION

Camera-based surveillance systems represent the latest in video technology, used in many environments, such as along streets, and in airports and business establishments. Today's images are much better than in the past, when shots were blurry and hard-to-follow. The latest setups feature live streaming video with sharp, color images at up to 500 lines of resolution. The systems allow police or other monitoring personnel to remotely monitor and control the cameras, zooming in on trouble spots from headquarters miles away.

Digital surveillance systems are growing more powerful, less expensive—and increasingly common. As an example of one application, many U.S. cities are using traffic cameras to photograph motorists who drive through red lights.

The latest technology lets operators pan, tilt or zoom their cameras via the Internet or a company's computer network. A single monitor can simultaneously display images from a number of cameras, reducing the expense of multiple screens. Finding a particular image used to mean hours of scrolling through analog tapes. Doing it digitally takes less than a minute. The systems can now trip an alarm or send alerts by page, e-mail or telephone.

Video surveillance systems today generally rely on operator visual monitoring for detection of incidents. The limited automation commonly available includes timed video multiplexing and alarm-based video switching. The amount of video data presented to security personnel for monitoring can be overwhelming; resulting in reduced vigilance, late detection, or event detection failure. Computer automated image analysis can provide automated event detection and alarm generation operations, thereby reducing the volume of data presented to security personnel. Computer automated surveillance can monitor large areas and handle complex time-varying images. Presentation of a video feed to surveillance personnel after computer image analysis has detected an event will support improved vigilance and increase the probability of incident detection.

Current video motion detection systems implement simplistic image processing approaches. False triggers are generated by moving foliage, passing headlights, cloud shadows, etc. Operation of these systems is only feasible in highly constrained applications.

SUMMARY OF THE INVENTION

The methods of the present invention exhibit several advantages over other monitoring system types proposed or in use. The response of the present invention to the appearance of motion in an area of interest is virtually immediate. Additionally, camera placement and predetermined threshold values can be chosen so that there are virtually no missed incidents. The invention's methods work equally well during daylight, transition, and dark conditions. Performance is also not substantially degraded during rain, fog, ice, and snow conditions or intense sources of artificial light. Indeed, the invention may be used to detect certain localized conditions, such as snow, ice, water, or fuel on a roadway.

The present invention comprises methods for substantially automatic and real-time detection of motion objects in video imagery. Because video imagery often contains motion which is not of interest (such as moving foliage), which may not be controlled, and/or which may occur in the same spatial position as motion of interest, the present invention uses a model-based approach in which anticipated motions are encoded in a model of the scene. Motions later detected by image analysis algorithms are compared to the model and classified as anticipated motions of interest, anticipated motions not of interest, or unanticipated motions. Various actions may then be executed by the system i.e., alarm generation or presentation of video replay and additional data to a human operator.

The present invention incorporates advanced algorithms that include temporal processing and model based analysis to achieve machine perception and recognition of normal scene motions. Subsequent discrepancies between the scene and the model are then detected and compared to classification criteria for disposition. This approach allows moving objects such as animals, people, and vehicles to be recognized, while disregarding and overcoming false triggers caused by moving foliage and changing illumination. In addition, stationary objects added to a scene, such as a package or suitcase, can be detected.

DETAILED DESCRIPTION

Reference Images for Incident Detection

Figure 1:
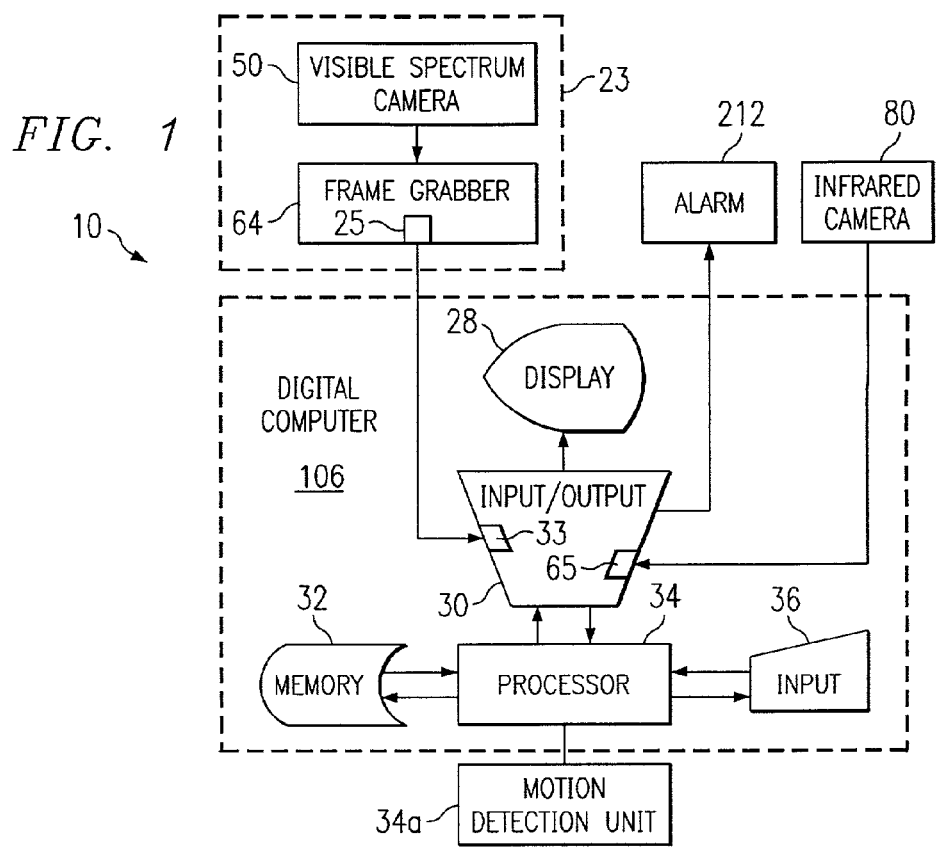
FIG. 1 illustrates apparatus for detecting incidents in a region of interest, including a motion detection unit in accordance with the invention.

U.S. patent Ser. No. 08/968,916, entitled "Methods and Apparatus for Traffic Incident Detection", describes various apparatus and methods for substantially automatic and real-time location of roadways, as well as location and characterization of vehicular traffic and traffic-related incidents. One method described therein is a method of identifying vehicles in traffic, using infra-red images and detecting "thermal emission pairs", which are characteristic of vehicles.

Many of the concepts described in U.S. patent Ser. No. 08/968,916 can be applied to incident detection that is not necessarily related to vehicular traffic. Specifically, various concepts described therein related to motion detection can be applied to any type of surveillance.

Incidents detectable using various motion detection algorithms include the appearance (or disappearance) of objects in an area of interest. Because of the substantially real-time warnings of incidents obtainable from the present invention, it is particularly suitable for security surveillance. In embodiments comprising closed-loop control systems for telescope optics, several such sites of particular interest can be monitored from one location.

Technologies used in the present invention allow identification of actual and potential incidents in daylight or at night. Because the occurrence of each incident is detected in substantially real time, the time-since-occurrence may be readily determined and can be shown on a display.

As an aid to image analysis, either by a human operator or automatic means, the invention includes a method of distinguishing between stationary and moving objects. The method comprises calculating a median pixel characteristic value (pixel color, intensity or thermal emission intensity, for example) for each respective pixel in the image sequence, where the image sequence comprises at least a first image and a second image. Moving objects can be identified, by association with pixel values that do not match the median value. Once identified, moving objects may be removed from the image sequence by replacing each respective pixel characteristic value in at least one image of the image sequence with each respective median pixel characteristic value. As explained below, the resulting image is a reference image, which can be compared to other images, to determine if objects have appeared or disappeared.

For example, the reference may be used to detect the appearance of substantially stationary objects in a region of interest. Complementing this method is an analogous method of signaling the disappearance of substantially stationary objects that appeared earlier in a region of interest. The former method comprises determining the location of a roadway in at least two images of the time sequence available at a first time by one of the methods described above, the images comprising a first image subset. Moving objects are removed from images of the first image subset as described above, and a first reference image is chosen from the first image subset. For signaling the disappearance of substantially stationary objects that appeared earlier, the first reference image is chosen from an image subset available at a first time prior to the appearance of the objects as signaled by the method above. At least two additional images of the time sequence are obtained after a second time, the second time being later than the first time, and the additional images comprise a second image subset. Moving objects are removed from images of the second image subset as above, and a second reference image is chosen from the second image subset. The first and second reference images are then computationally compared. Detecting significant differences signals the appearance of substantially stationary objects in the region of interest between the first time and the second time.

As explained below, the reference image may also be used to detect motion objects in a region of interest. The reference image is compared to an image to be analyzed to detect motion, to obtain a "temporal difference image." This image is further processed to extract and classify objects.

Model-Based Motion Detection in Video Images

FIG. 1 illustrates a surveillance system 10, having a motion detection unit 34a in accordance with the invention. Motion detection unit 34a operates in conjunction with, or may be part of a digital computer means 106. A visible spectrum video camera 50 and frame-grabber 64 acquire visible spectrum images. Camera 50 communicates with a wireless transmitter 25, which corresponds to wireless receiver 33 of computer input-output means 30. Infrared camera 80 is wired to frame-grabber means 65 which also resides in computer input-output means 30, and optional external alarm means 212 can be activated through computer input-output means 30. In addition to input-output means 30, computer means 106 comprises memory means 32, processor means 34, display means 28 and input means 36.

Cameras 50 and 80 are representative of the cameras that may be used to acquire video data for purposes of the invention. These include monochrome and color visible-spectrum cameras, near-infrared (700–1100 nm), thermal infrared (3–5 um and 8–14 um), or multi-spectral signals produced by a camera or combinations of cameras. Images in the visible light spectrum will preferably be obtained using a charge-coupled device color camera sensitive to red, green, and blue wavelengths corresponding to the color model for human vision. Various embodiments of the invention may involve the use of both infrared and color cameras that are mechanically coupled such that the three-dimensional position and orientation of each camera relative to the other is known. For purposes of this description, motion images acquired by any of these camera types are referred to as "video images", irrespective of format characteristics such as resolution or frame rate.

Methods of the invention may be applied to video signals obtained from fixed cameras or more generally variable aiming cameras, such as a camera on a pan/tilt mechanism. The processing operation of image registration would be conducted as necessary for images obtained from variable aiming cameras or fixed cameras on non-rigid platforms.

The methods described herein are preferably performed using the computational capabilities of programmable digital computers so that the results are obtained in the time required to scan several video frames. This provides the capability for real-time detection of incidents so that practically immediate response can be provided. The use of stored program computers also provides the capability of performing monitoring and control functions automatically, that is, substantially without operator assistance. In some cases, however, it may be desirable to make use of operator assistance. In this case the computer can be programmed to activate supplemental displays and/or alarms, and/or to add graphic symbols to a monitor screen to highlight or otherwise distinguish a region of interest image and direct the operator's attention to a specific incident or hazard.

Input-output means 30 may be configured to receive signals transmitted, for example, by insulated electrical conductor(s) and/or to receive wireless (e.g., radio or infrared) signals from wireless transmitter means 25 with wireless receiver means 33. Flow of signals through input-output means 30 to processor means 34 and memory means 32 is controlled by processor means 34 using instructions (that is, a program) stored in memory means 32 and/or instructions from manually-actuated input means 36. Processor means 34 includes a time base to facilitate calculation of time intervals between images and speeds (distance traveled per unit time). Depending on the embodiment of the invention considered, processor means 34 preferably executes image-processing algorithms according to the methods described herein and presents a desired processed image on display means 28 through input-output means 30. Display means 28 may comprise two or more video monitors for substantially simultaneous display of different kinds of incidents.

Memory means 32 may comprise, for example, magnetic tape, magnetic disks, or non-magnetic solid-state devices (e.g., optoelectronic memory or solid state switches). Manually-actuated input means 36 may comprise, for example, magnetic cards, paper or magnetic tape, a key board, one or more switches, or graphical pointing means such as a computer mouse, trackball or light pen. Processor means 34 and input-output means 30 may take the form, in preferred embodiments, of the analogous sections of a personal computer, as may display means 28.

Images of areas of interest will preferably be stored electronically in digital memory means 32. Digital image data may be obtained from a video digitizer for converting the analog signals from the camera(s) to digital values. Relatively short-term storage of the digital representation of camera images may occur in frame-grabber means as commonly found in commercially-available digital video editing systems.

Display means 28 may comprise, in addition to or in place of one or more video display screens, a digital readout device and/or an auditory alarm indication to direct an operator's attention to an event indicated on a display screen. Note also that one or more display screens of display means 28 may carry substantially unprocessed real-time video images of regions of interest. Optional alarm means 212 can furnish warnings of incidents and their locations to support personnel in law enforcement, maintenance and/or emergency medical services.

Figure 2:
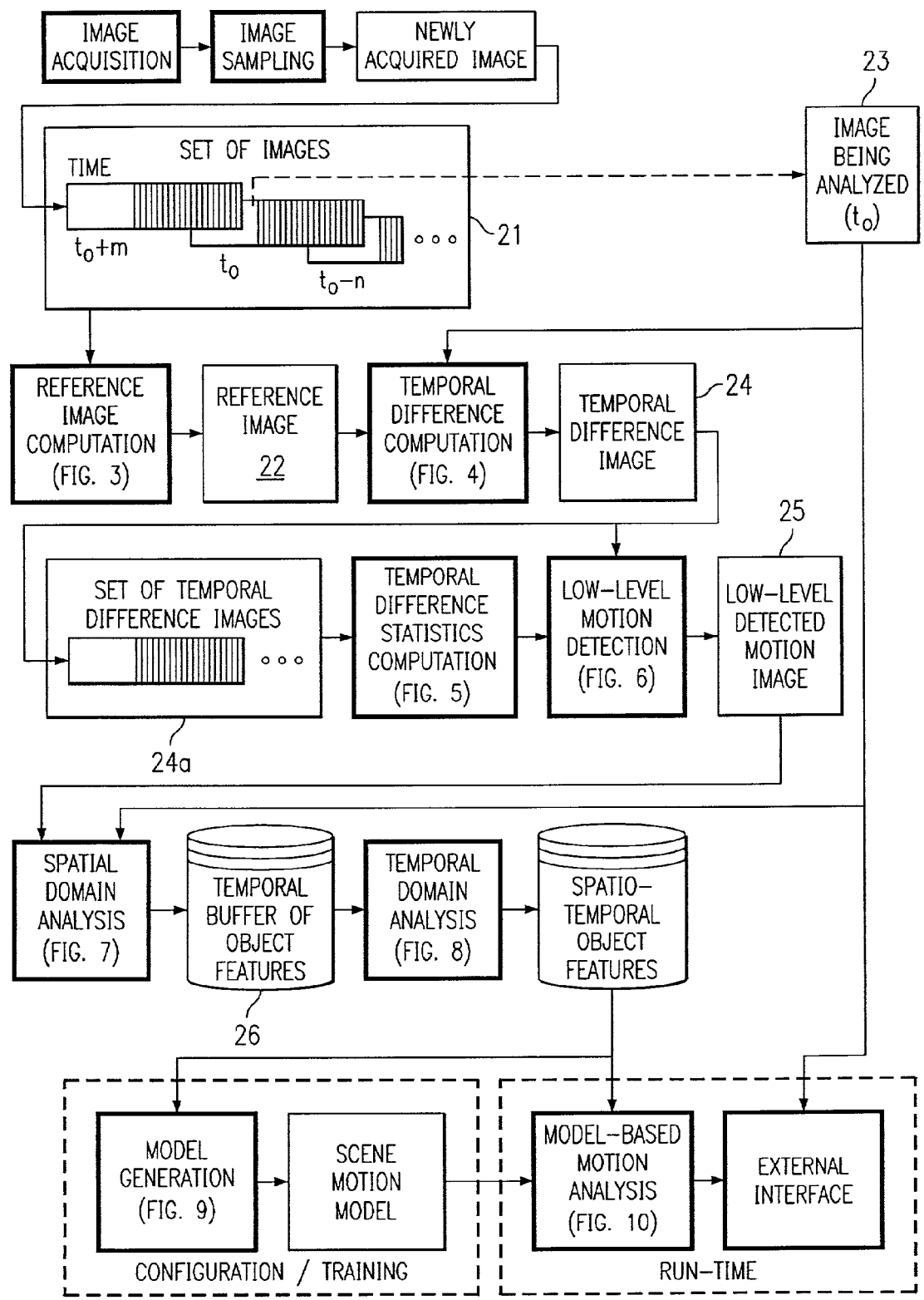
FIG. 2 illustrates a method of detecting motion in a region of interest.

FIG. 2 illustrates the overall operation of motion detection unit 34*a*. As explained below in connection with FIGS. 3–10, motion detection unit 34*a* performs a number of processing tasks, which include the following: means for generating a reference or background image of a scene, which does not contain any motion objects, means for low level detection of motion by comparing a "new" image to the reference image, means or characterizing and filtering the motion objects detected by the low-level operations where such characterization and filtering are conducted first in the spatial domain (processing only the low-level results associated with the "new" image) and secondly, in the temporal domain (processing spatial domain results of a sequence of images in time), means for comparison of the spatial and temporal signatures of the detected motion objects with a model of the scene, resulting in classification of each motion object.

As indicated above, temporal filtering can be used for substantially automatic and real-time detection of motion objects in video imagery. Because video imagery often contains motion which is not of interest, which may not be controlled, and/or which may occur in the same spatial position as motion of interest, the present invention uses a model-based approach in which anticipated motions (which may include motions of interest and motions not of interest) are encoded (described/represented) in a model of the scene. Motions later detected by image analysis algorithms are compared to the model and classified as anticipated motions of interest, anticipated motions not of interest, or unanticipated motions. Various actions may then be executed by system 10, i.e., alarm generation or presentation of video replay and additional data to a human operator.

The methods and apparatus of the invention may generally be used for (but are not limited to) surveillance, security, and safety applications. Example motions of interest may include detection of people in general, detection of person in guarded area or zone (as opposed to adjacent unguarded zone), detection of suspicious behavior (person meandering through parking lot on other than path to/from facility entrance), detection of large animals along highway right-of way, detection of object or package left by a person, detection of vehicles, detection of unusual vehicle position/speed/path/motion. Other specific motions of interest may be characterized and detected by the methods of the invention.

Anticipated motions of interest may include persons following a path (sidewalk), two or more persons congregating, a person loitering near a facility entrance, vehicles following prescribed paths, a vehicle stopping in a traffic lane.

Anticipated motions not-of-interest may include; motion of foliage blown by wind or turbulence of passing vehicles, motion of foliage shadows, motion of cloud shadows, shadow motion due to sun angle, appearance/disappearance of object shadows due to cloud passing, motion of animals, motion of wind-blown trash, apparent motion of car headlights on pavement or walls.

Unanticipated motions are any motions that are not modeled by the system. This might include a person walking across a field, a person walking through a parking lot and not going to/from a facility entrance, a large group of people congregating, or a vehicle stopping on the shoulder of a roadway.

Figure 3:
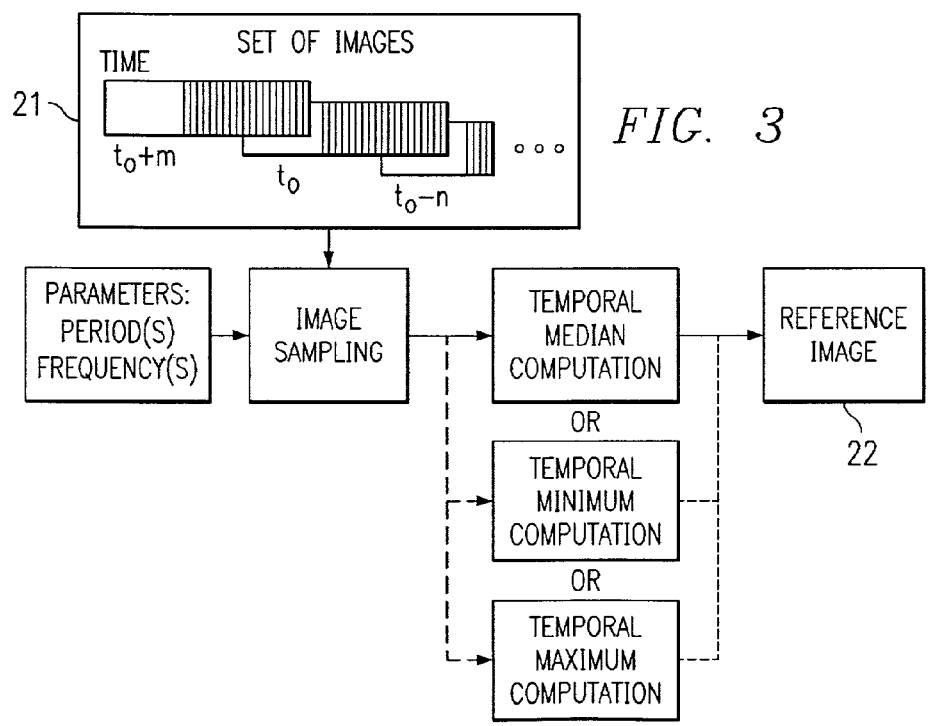
FIG. 3 illustrates the computation of the reference image.

FIG. 3 illustrates the computation of a reference image 22, based on a set of images 21 acquired by cameras 50 or 80. Parameters for this process include a sampling period and frequency. The reference image may be computed from many sensor images (video stream) and over a relatively long period of time (time span). Or, the images used for computation of the reference image may be a relatively small sample of the sensor images. The reference image may be recomputed periodically to accommodate changing ambient conditions. Multiple reference images may be computed, each with a different associated time span, to accommodate quickly varying (cloud shadows) and slowly varying (sun angle) ambient conditions. Image registration is performed for reference generation using imagery from variable aiming (pan/tilt) camera system.

Most processing to acquire the reference image will be performed in accordance with the temporal median filtering described above. Thus, the median value of each pixel from the image sequence is selected as the reference image pixel value in the general case. However, the minimum or maximum value of each pixel may be selected in special cases where detected motion objects are expected to be brighter than or darker than the reference image, respectively. The result of the temporal filtering is a reference image 22, from which motion objects have been removed.

Figure 4:
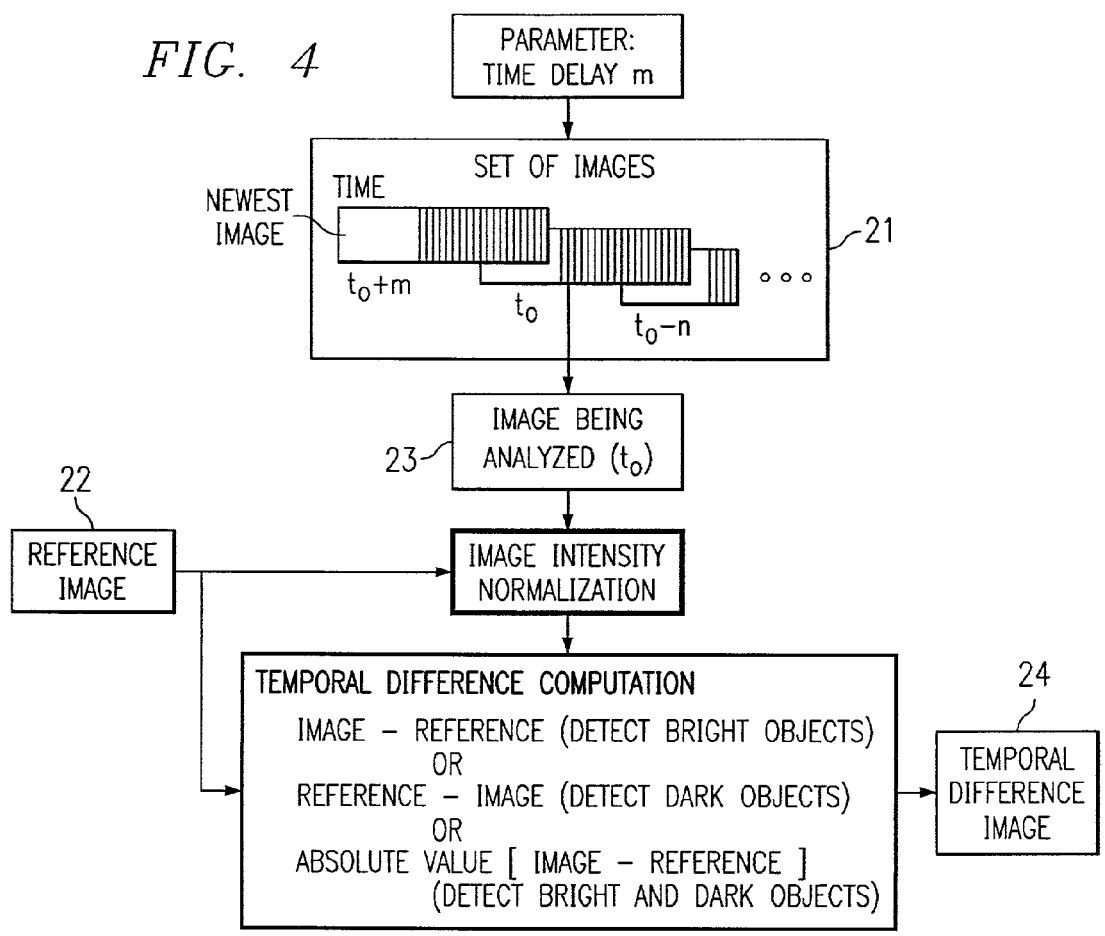
FIG. 4 illustrates the computation of a temporal difference image.

FIG. 4 illustrates a temporal difference computation that is performed on a sensor image (the particular image being analyzed) 23. Image intensity normalization may be used to correct for changing ambient conditions. For example, a global difference between image 23 and the reference image 22 may be used as an offset. Separation of global versus local illumination may be used to compensate for conditions such as sun-angle, cloud movement, or street lighting).

Temporal difference filtering involves detecting motion in a sensor image by computing a temporal difference image from image 23 and reference image 22, which is absent of motion objects. The temporal difference image may be computed as the absolute value of the difference between the sensor image 23 and the reference image 22. Alternatively, the temporal difference image may be computed as the positive or negative signed difference between the sensor image 23 and the reference image 22, for the special cases of detecting motion objects brighter than or darker than the reference image (scene background). The result of the temporal difference computation is a temporal difference image 24.

Typically, the time relationship between the sensor image 23 and the reference image places the sensor image near the center of the reference image time span. However, a sensor image and past history reference image may be used in computation of the temporal difference to minimize processing time.

Figure 5:
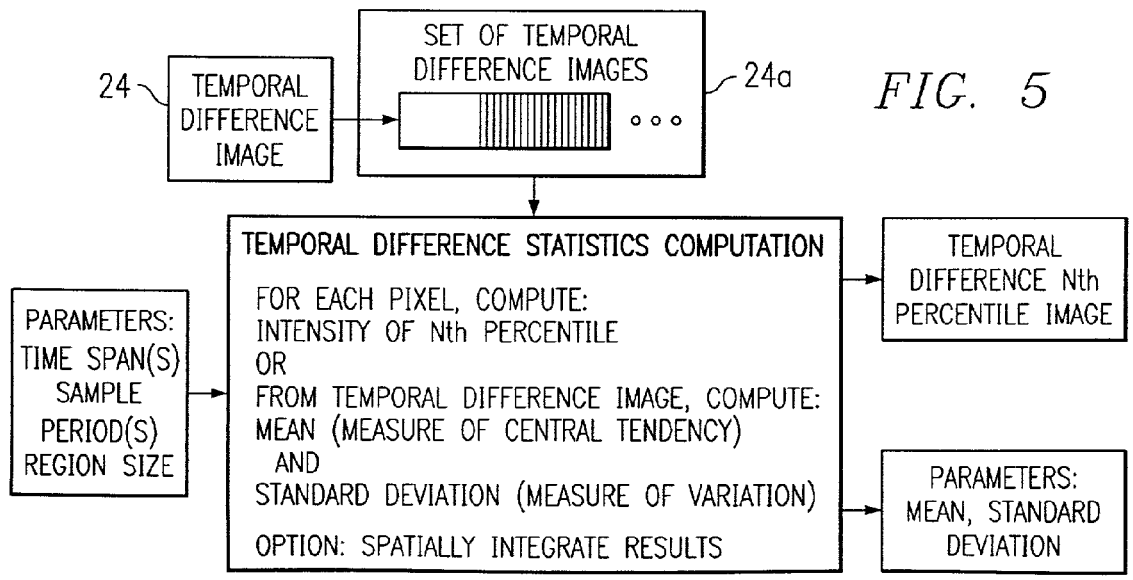
FIG. 5 illustrates the computation of temporal difference statistics.

FIG. 5 illustrates the computation of temporal difference statistics, obtained from a set of temporal difference images 24. One such statistic is a measure of central tendency, computed from the temporal difference image, as a median or mean. Another statistic is an intensity of Nth Percentile. This measure sets a threshold below the motion-caused temporal difference. Regions with frequent background motion will have a normal temporal difference signal below the Nth percentile (where N is greater than 50%). Another statistic is a measure of mean and standard deviation. Computations are evaluated at each pixel over the set of temporal difference images. The computations provide a local measure of expected temporal difference response, and yield images encoding an expected response variation. The parameters may include time span(s) and temporal sampling parameters. The results may be integrated over local neighborhoods of pixel, such as by spatial smoothing or by decimate image to reduce computation.

Figure 6:
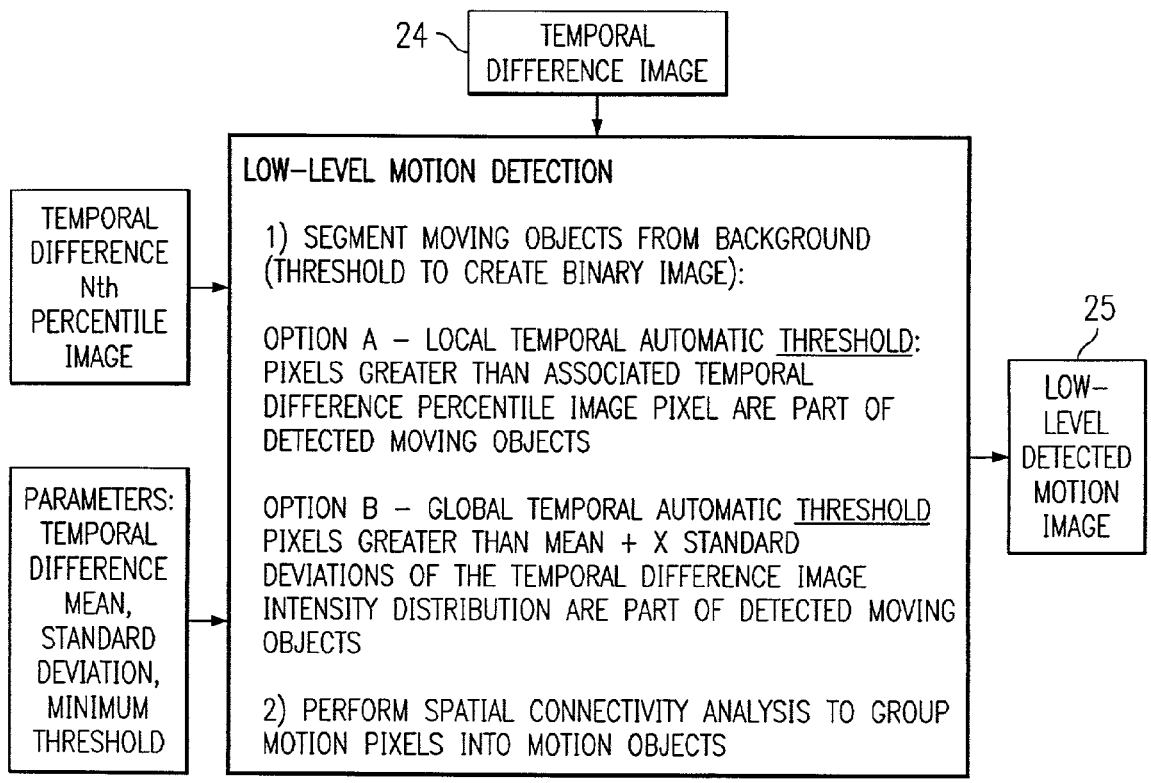
FIG. 6 illustrates a process for low-level motion detection.

FIG. 6 illustrates a low level motion detection process. This process involves separation of motion objects from background in the temporal difference image. For thresholding, it generates a binary image, which includes motion objects and noise. The general case uses local temporal automatic thresholding, where a threshold is set independently for each pixel based on Nth percentile intensity over time (temporal difference statistic). The thresholding may alternately be based on mean and standard deviation of pixel intensity over time (temporal difference statistic). A minimum threshold level may be used, to prevent thresholding into the noise when little motion is present. The parameters include a time-span and a sampling rate. Another type of thresholding is global automatic thresholding, where a global image threshold is set relative to standard deviation and mean of temporal difference image pixel intensities (i.e. mean+1.5×stdev).

Thus, in general, the process of FIG. 6 computes an independent threshold for each pixel of the temporal difference image for the purpose of detecting motion. The threshold value for a pixel may be based on the variation of the pixel value over a sequence of temporal difference images. The value of the pixel represented by the Nth percentile of the ranked values of that pixel from the set of temporal difference images may be used as the threshold. The percentile level (N) may be selected as appropriate to differing applications due to anticipated frequency of motion and sensor noise levels. The temporal difference images used for computation of the threshold level may be a sample of the full set of temporal difference images (reducing computation). The temporal span of the of the set of temporal difference images may be selected to be greater than the period over which a motion object is located at a pixel. The set of threshold values is of the same size as the temporal difference image, in general, and could be referred to as a temporal difference threshold image. A set of temporal difference threshold images could be computed, each with an associated time span, for the purpose of detecting and distinguishing between cyclic motions with greater and lesser frequencies.

The low level motion detection may also use binary morphological filtering, which deletes single pixels (noise), or small or narrow pixel groups (edge noise). For spatial connectivity analysis, connected binary pixels are grouped into candidate motion objects. A motion detection filter may be used to detect interlace artifacts associated with fast-moving objects. A high-pass filter may be used to detect multiple horizontally-oriented lines with 2-pixel pitch. The result of the process of FIG. 6 is a low-level detected motion image 25.

Figure 7:
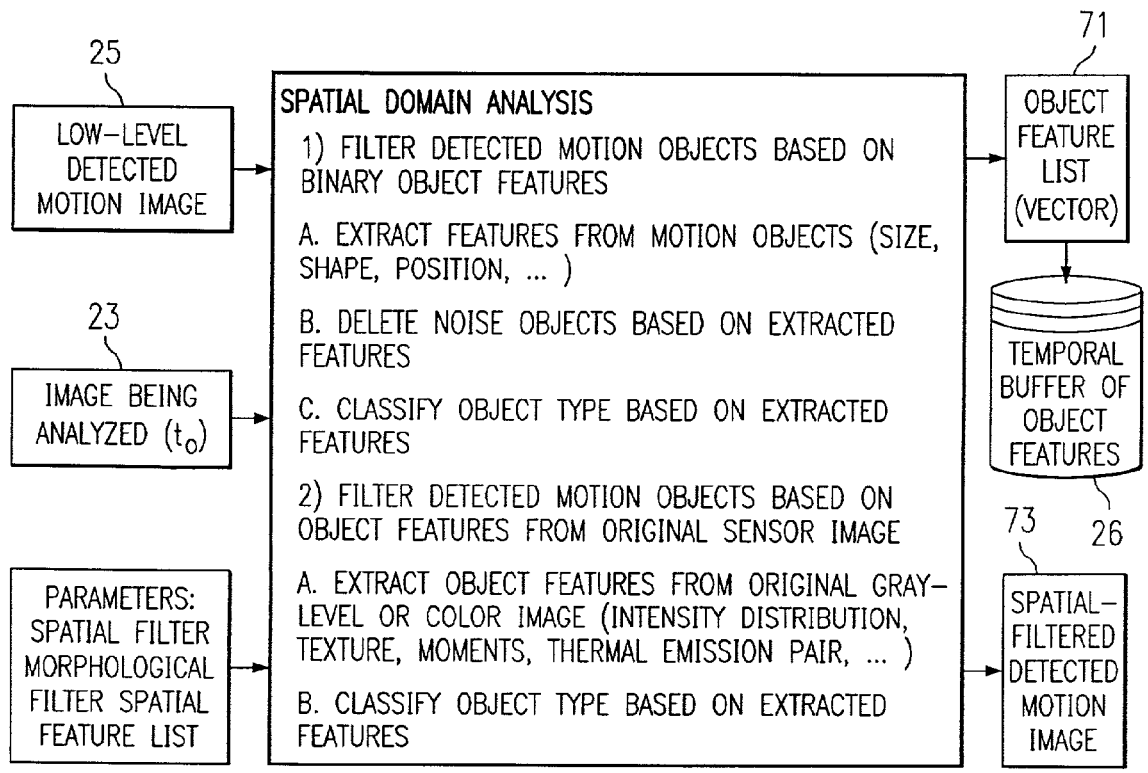
FIG. 7 illustrates spatial domain analysis of the low-level detected motion image.
Figure 8:
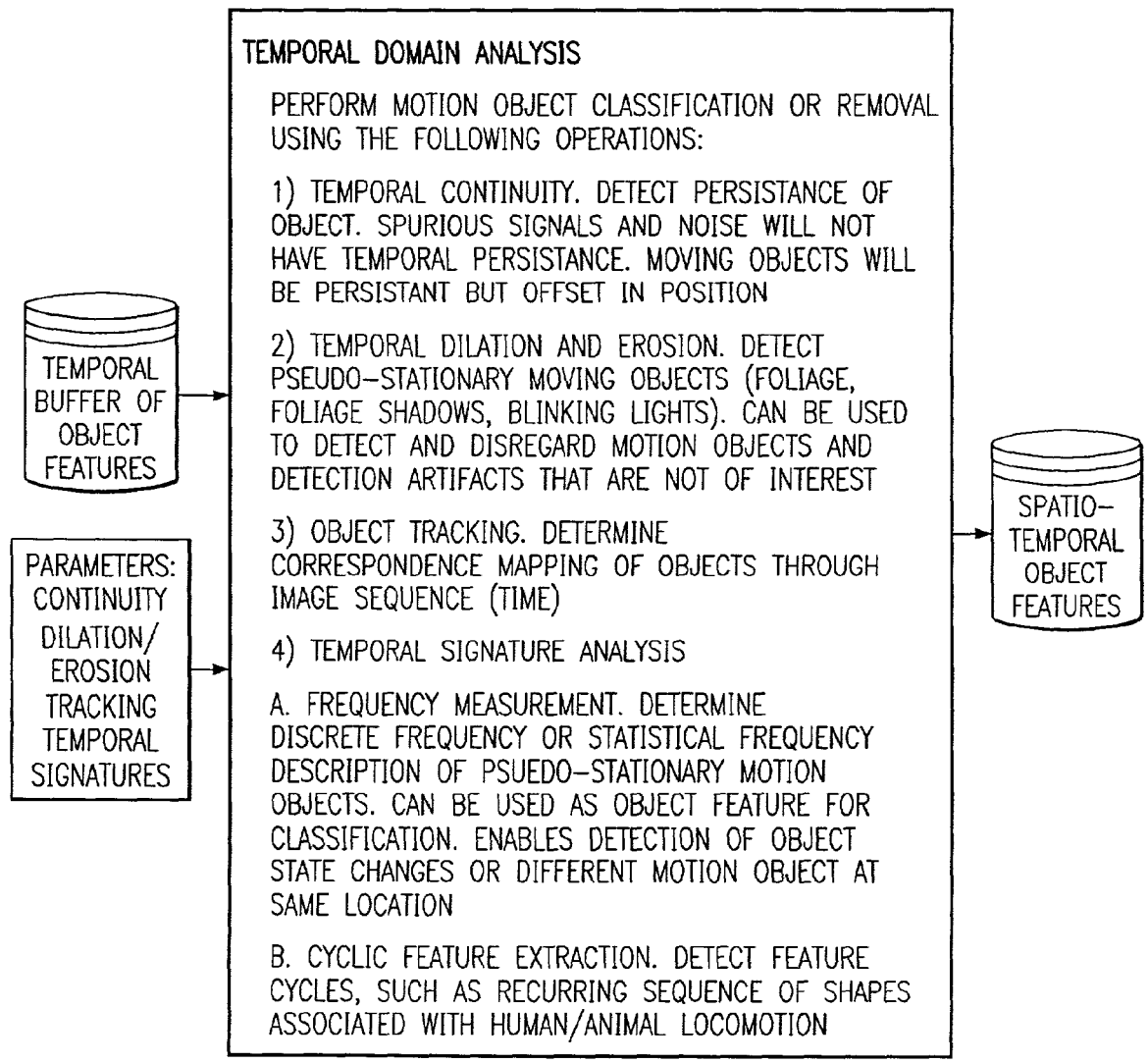
FIG. 8 illustrates temporal domain analysis of the low-level detected motion image.

The processes of FIGS. 7 and 8 provide for detection of motion objects by generating a binary image from the threshold image(s) 25 from the process of FIG. 6. Each pixel intensity value in the temporal difference image greater than the value of the corresponding pixel in the threshold image is assigned a binary image value of 1, indicating that it may be associated with a motion object. Otherwise, the pixel is assigned a binary image value of 0, indicating that no motion is detected at that pixel. Further operations such as binary morphology may be used to filter out (remove from the image) single and small or narrow groups (adjacent) pixels (binary value 1) which may be regarded as noise. Further operations may also be used to determine the connectivity (grouping) of pixels with binary value 1 and uniquely label each group as a low-level motion object.

Specifically, FIG. 7 illustrates a spatial domain analysis, based on the low-level detected motion image 25 and the image being analyzed 23. Detected motion objects are filtered based on binary object features.

Spatial analysis extracts spatial features of each low-level motion object. Features may be extracted from the binary image and may include, but are not limited to: position, height, width, area, shape descriptors, and physical size (size estimate based on image position and range map). Features may be extracted from the associated original sensor image (pixels associated with the object binary pixel group and may include, but are not limited to: mean intensity, intensity range, intensity variation (standard deviation), texture descriptors, and moments of the intensity values. The features extracted may be selected appropriate to the specific application to achieve necessary discrimination power between the various classes of motion objects.

Filtering may be used to remove spurious noise, classify detected objects, persons, or vehicles. Based on classification criteria, objects may be classified from set-points (i.e. minimum area to be a person, vehicle, etc), statistics (i.e. signature distributions of different classes of objects observed from training data), or parametric criteria (i.e. relationship between object size and position in image).

The set of features for each motion object is stored in a buffer 26 associated with the time stamp of the associated original sensor image 23. This buffer 26 is referred to as a temporal set of object features.

FIG. 8 illustrates a temporal domain analysis, which is based on the temporal buffer of object features 26. Motion object classification or removal is performed based on various operations. A temporal continuity process determines whether an object is present for several frames (filter out spurious noise). If an object is in motion, time sequential object regions touch, or are dilated to touch, or predict new positions. A temporal dilation and erosion (time scale) process detects pseudo-stationary persistent motion. A temporal connectivity and object tracking process determines correspondence mapping of objects in temporal image sequence. Considerations for this process are adjacency and limits on possible motion. Object features are matched and signatures determined (for tracking multiple objects through occlusion). The temporal connectivity process may provide new features, such as a motion vector or speed. A temporal signature extraction process (i.e. feature extraction) examines frequency or period (statistical description) of motion object observation at (covering) a pixel. It filters out such objects as moving foliage and blinking lights, but retains detection of motion objects with a different frequency. A periodic signal (i.e. cyclic pattern of object spatial feature; shape, . . . ) may be detected. For example, a gait of a person or animal may be indicated by a pattern of shape changes. A profile transformation process identifies such motion as a vehicle that changes shape (and direction) when going around corner or an animal profile may be related to orientation. For vehicles an inverted thermal emission pair indicates semi-tractor trailer versus a car.

As stated above, the motion detection methods of the present invention are model-based. The programming for motion detection unit 34a is developed using training data and configured according to low-level image processing/analysis parameters. During training, filters are selected and thresholds set. Sampling, analysis periods, and time-scales are determined as appropriate to the application (highway traffic versus railway traffic).

Figure 9:
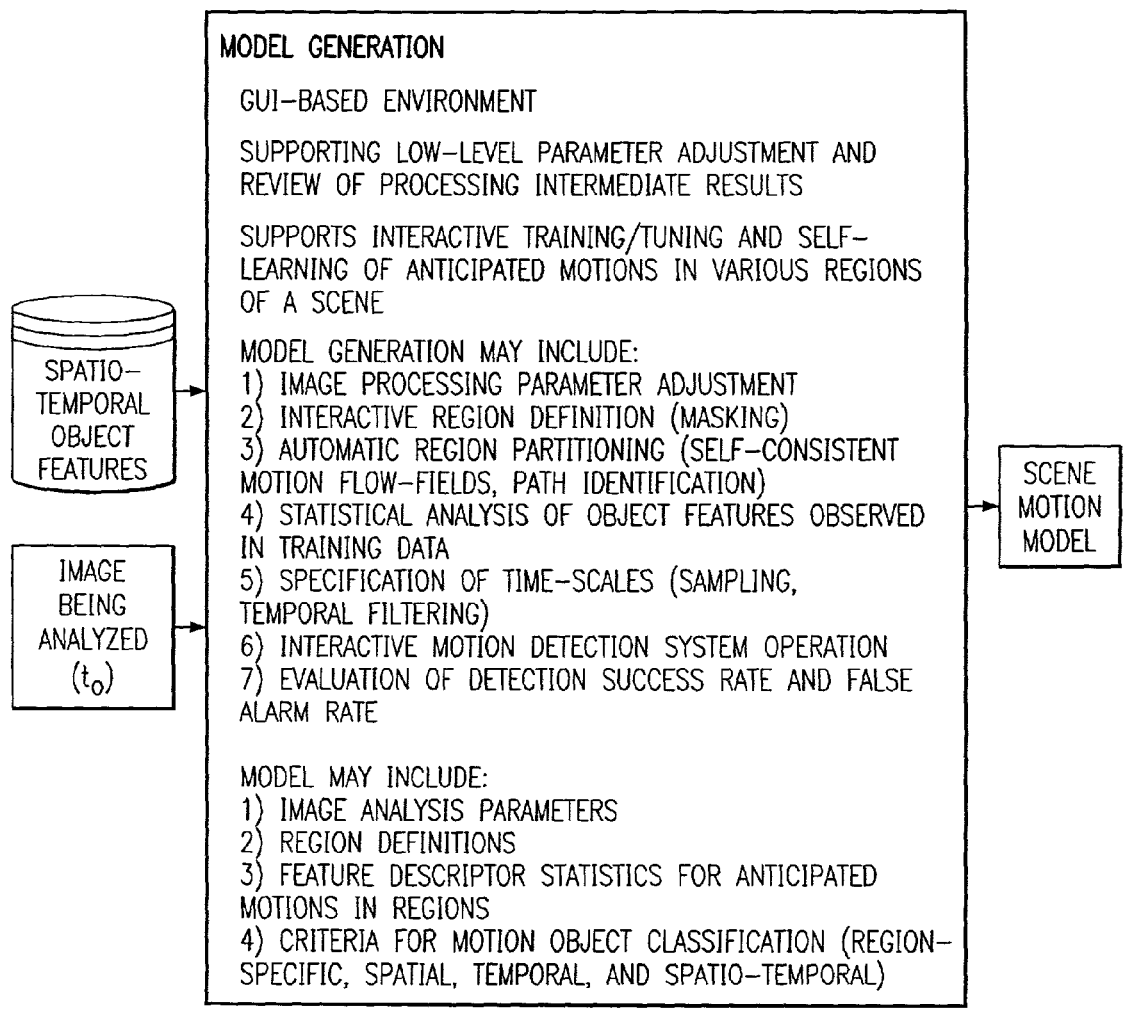
FIG. 9 illustrates generation of the motion model.

FIG. 9 illustrates the model generation phase of operation. This phase involves interactive training and self-learning of anticipated motion objects and pseudo-stationary motions. During region segmentation, regions with self-consistent anticipated objects and flow fields are identified. Features of anticipated objects are encoded. These include spatial features, such as size, shape, expected positions, etc, and temporal features, such as speed, direction, path (flow field), temporal signature, etc. Statistical feature descriptors are also generated as part of the model. Features associated with regions of scene are also encoded. These include region boundaries, anticipated objects, and pseudo-stationary motion (moving foliage, foliage shadows). Another encoding may be of diurnal effects if appropriate (foliage shadow motion region moving with sun angle, motion region stationary at night due to fixed outdoor lighting).

Figure 10:
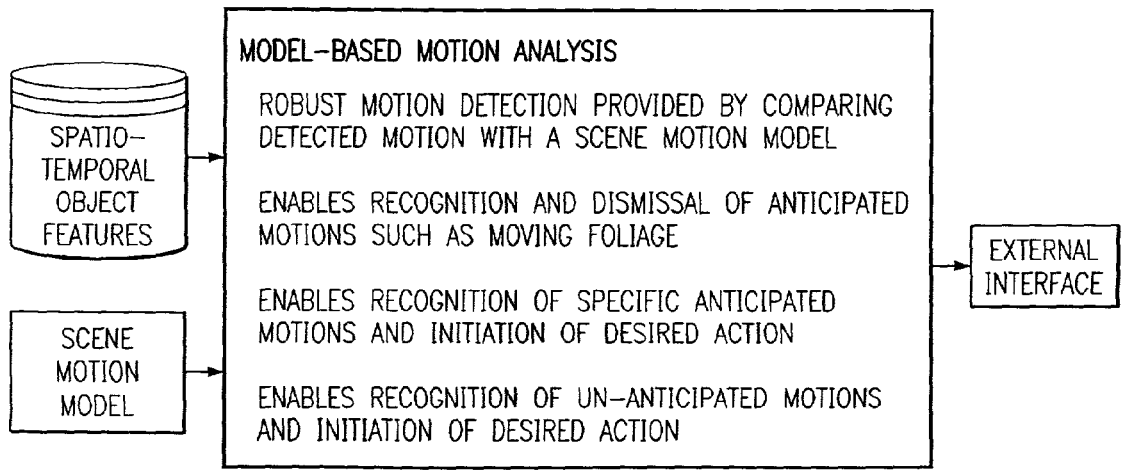
FIG. 10 illustrates analysis of the image of interest relative to the motion model.

FIG. 10 illustrates the actual model-based motion analysis, which compares detected motions with the model. Motion objects have spatial and temporal features (signatures). They are classified as anticipated type or unanticipated. Anticipated motions are disregarded as desired. Specific anticipated motions are recognized. Based on the results of the analysis, a desired action (alarm, equipment activation, etc), may be performed. Similarly, unanticipated motions are recognized and desired actions performed.

In accordance with the above, the method of FIG. 2 provides model-based motion detection, which encodes anticipated motions of interest and anticipated motions not-of-interest in a motion model of a scene. Anticipated motions of interest and unanticipated motions are detected. Anticipated motions not of interest are filtered out or disregarded.

To construct the model, data consisting of spatial and temporal signatures of motion objects are extracted from a video stream. These signatures, observed over an appropriate period of time, are used to construct a motion model of a scene. The motion model may include spatial positions or regions and signature descriptors of anticipated motions. The model may further be adaptive to achieve better characterization of the classes of motion objects that it encodes and to encode new classes of motion objects initially classified as unanticipated motions.

Comparison of observed motion object signatures to the scene motion model allows classification of motion objects as specific types of anticipated motions of interest, anticipated motions not-of-interest, or unanticipated motions. Generally, detection of motion objects not-of-interest generally results in no response being generated by the system. Detection of anticipated motion objects of interest or of unanticipated objects may result in a programmable response by the system (data logging, alarm generation, operator notification, etc.).

What is claimed is:

1. A method of using video images to monitor incidents in a region of interest, comprising the steps of:
    computing a reference image from a set of images by removing moving objects from the set of images;
    storing a motion model representing anticipated motion in the region of interest;
    acquiring a image to be analyzed;
    computing a temporal difference image by comparing the image to be analyzed with the reference image;
    repeating the step of computing a temporal difference image to obtain a set of temporal difference images;
    calculating, from the set of temporal difference images, at least one temporal difference statistic for each pixel;
    detecting motion in a temporal difference image by separating motion pixels from background in the temporal difference image, using the temporal difference statistic; grouping motion pixels into motion objects;
    extracting features from the objects;
    comparing the features of motion objects to the motion model; wherein the motion model classifies objects as anticipated or not anticipated; and
    wherein the motion model further classifies anticipated objects as being of interest or not of interest.

2. The method of claim 1, wherein the step of computing a reference image is performed by calculating a median pixel value for each pixel in an image sequence, the image sequence comprising at least a first image and a second image, and by removing moving objects from the image sequence by replacing each pixel value in at least one image of the image sequence with the median pixel value.

3. The method of claim 1, wherein the step of computing a reference image is performed by determining a minimum pixel value for each pixel in an image sequence, the image sequence comprising at least a first image and a second image, and by removing moving objects from the image sequence by replacing each pixel value in at least one image of the image sequence with the minimum pixel value.

4. The method of claim 1, wherein the step of computing a reference image is performed by determining a maximum pixel value for each pixel in an image sequence, the image sequence comprising at least a first image and a second image, and by removing moving objects from the image sequence by replacing each pixel value in at least one image of the image sequence with the maximum pixel value.

5. The method of claim 1, wherein the step of computing a temporal difference image is performed by subtracting pixel values in the image to be analyzed from pixel values of the reference image.

6. The method of claim 1, wherein the step of computing a temporal difference image is performed by subtracting pixel values in the reference image from pixel values of the image to be analyzed.

7. The method of claim 1, wherein the step of computing a temporal difference image is performed by calculating the absolute value of the difference between pixel values in the image to be analyzed and pixel values of the reference image.

8. The method of claim 1, wherein the temporal difference statistic is an nth percentile statistic.

9. The method of claim 1, wherein the temporal difference statistic is a mean statistic.

10. The method of claim 1, wherein the temporal difference statistic is a standard deviation statistic.

11. The method of claim 1, wherein the step of detecting motion is performed by using the temporal difference statistic of each pixel to determine a threshold and by comparing the temporal difference image with the threshold pixel values.

12. The method of claim 11, wherein the threshold is based on an nth percentile statistic.

13. The method of claim 11, wherein the threshold is based on a standard deviation statistic.

14. The method of claim 1, wherein the classifying step is performed by extracting spatial features.

15. The method of claim 1, wherein the classifying step is performed by extracting temporal features.

16. The method of claim 1, further comprising the step of generating a response signal in response to the classifying step.

* * * * *